United States Patent Office 3,544,512
Patented Dec. 1, 1970

3,544,512
STABILIZED POLYOLEFIN COMPOSITIONS
Andrew J. Dietzler, Midland, Mich., assignor to The Dow Chemical Company, Midland, Mich., a corporation of Delaware
No Drawing. Original application Dec. 13, 1965, Ser. No. 513,543. Divided and this application Jan. 22, 1968, Ser. No. 725,551
Int. Cl. C08f 45/58
U.S. Cl. 260—45.95                  5 Claims

ABSTRACT OF THE DISCLOSURE

Poly α-olefins are stabilized against oxidative degradation by the incorporation of a small amount of a trinuclear bisphenol which can be prepared by reacting a meta- or para-dialkenylbenzene where alkenyl is vinyl or isopropenyl or a xylylene dihalide with an o-cycloalkylphenol. An auxiliary antioxidant such as dilauryl 3,3'-thiodipropionate is also preferably present in the stabilized composition.

---

This is a division of our copending application Ser. No. 513,543 filed Dec. 13, 1965.

The present invention relates to new chemical compounds and to polymeric compositions stabilized by such compounds.

These new compounds are high molecular weight bisphenols having the general formula

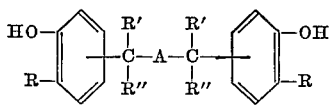

wherein R is cycloalkyl of 5–6 carbon atoms, i.e., cyclopentyl or cyclohexyl, R' and R" are hydrogen or methyl, and A is a meta or para phenylene radical as represented by one of the formulas

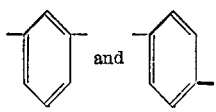

These compounds when pure, are white crystalline solids of moderate melting points, soluble in most organic solvents but essentially insoluble in water. Some members are more commonly obtained as mixed isomers and these mixtures are amorphous glassy solids, light tan to brown in color.

The above compounds can be prepared by various known methods of synthesis, for example, by the alkylation reaction of the appropriate bis(α-haloalkyl)benzene or the corresponding diol with a cycloalkylphenol. A convenient and preferred method for preparing these new bisphenols where at least one of R' and R" is methyl comprises reacting divinylbenzene or diisopropenylbenzene with o-cyclopentylphenol or o-cyclohexylphenol at about 50–150° C., in the presence of a strong mineral acid. Preferably, the reaction is carried out in the presence of anhydrous HCl using an excess of the cycloalkylphenol as a reaction solvent. The product is best isolated by distilling the volatile components from the reaction mixture, thereby leaving the crude bisphenol as a distillation residue. The product can be further purified if desired by crystallizing it from a suitable organic solvent.

The p-phenylene bisphenols, particularly those derived from p-diisopropenylbenzene where both R' and R" in the general formula are methyl, are preferred. The reaction of an o-cycloalkylphenol with p-diisopropenylbenzene yields a product wherein the phenolic rings are attached to the phenylenediisopropylidene radical largely para to the phenolic hydroxyl group, that is, the product is largely the 4,4'-(p-phenylenediisopropylidene)bis(2-cycloalkylphenol) with minor amounts of 2,4'- and 2,2'-isomers. These para bisphenols are easily obtained as colorless crystalline solids whereas other isomers and homologs of the general class are difficult to crystallize and are usually obtained as mixed isomers which are more or less colored. Since these compounds are most useful as stabilizers for polyolefins, color is often undesirable even though the mixed isomers are otherwise as effective for the purpose as the pure compounds.

EXAMPLE 1

Anhydrous HCl was bubbled into 528.8 g. (3 g. moles) of molten o-cyclohexylphenol at 120° C. to saturation. With continuing HCl addition, 79.1 g. of p-diisopropenylbenzene was added portionwise with stirring over a period of 1.75 hours at 118–124° C. Stirring and HCl addition were continued at 120–122° C. for another hour. The reaction mixture was then cooled to 60° C. 400 ml. of toluene was added, and the resulting solution was washed with six 400 ml. portions of water at 60–70° C. to remove the dissolved HCl. The washed solution was distilled to a pot temperature of 252° C. at 10 mm. to remove toluene, water, and unreacted o-cyclohexylphenol. The distillation residue was then steamed at 180–185° C. and 25 mm. to remove the last of the o-cyclohexylphenol. From the distillation and the steam distillation, a total of about 256 g. of o-cyclohexylphenol was recovered. The steamed residue was crude 4,4' - (p-phenylenediisopropylidene) bis(2-cyclohexylphenol), weight 235.4 g. This material was recrystallized from ethylcyclohexane to obtain the white crystalline compound, M.P. 163.5–164.8° C. The molecular weight of the crystalline product was found to be 505, calculated 510.5. Elemental analysis showed carbon, 84.5%; hydrogen, 9.0%. Calculated values are 84.6% carbon and 9.0% hydrogen.

EXAMPLE 2

Anhydrous HCl was bubbled into 198.4 g. 1.23 g. moles) of molten o-cyclopentylphenol at 100° C. to saturation. With continuing HCl addition, 42 g. of p-diisopropenylbenzene was added portionwise in 2 hours at 98–101° C. The reaction mixture was maintained at 100° C. for an additional hour. It was then dissolved in toluene, washed with water, and worked up by the procedure of Example 1 to obtain 25 g. of 4,4'-(p-phenylenediisopropylidene)bis(2-cyclopentylphenol). The product was recrystallized from ethylcyclohexane to obtain white crystals, M.P. 120.5–122° C. The molecular weight of the purified crystals was 476, calculated 482.7. Elemental analysis showed 84.3% carbon, 8.9% hydrogen. Calculated values are 84.5% carbon, 8.8% hydrogen.

EXAMPLE 3

By the general procedure described in Examples 1 and 2, 264.4 g. of o-cyclohexylphenol was reacted with 39.6 g. of m-diisopropenylbenzene in the presence of anhydrous HCl. The reaction product was distilled and steam distilled to remove volatile components, leaving as the distillation residue 121 g. of crude m-phenylenediisopropylidenebis(2-cyclohexylphenol), a tan brittle solid. The molecular weight of this material was determined to be 513, calculated 510.7. Elemental analysis showed 84.7% carbon and 8.93% hydrogen. Calculated values are 84.6% carbon and 9.0% hydrogen. Nuclear magnetic resonance spectroscopic analysis indicated that the product was largely 4,4-(m-phenylenediisopropylidene) bis(2-cyclohexylphenol) with minor proportions of the 2,4'- and 2,2'-isomers also present.

EXAMPLE 4

In accordance with the method of the foregoing examples, excess o-cyclohexylphenol is reacted with p-divinylbenzene in the presence of hydrogen chloride to obtain as the reaction product a mixture of 4,4'-(p-phenylenediethylidene)bis(2-cyclohexylphenol) with the corresponding 2,4'- and 2,2'-isomers.

In the same way, m-divinylbenene is reacted with o-cyclopentylphenol or o-cyclohexylphenol to obtain similar mixtures of the corresponding isomeric bisphenols, i.e., m-phenylenediethylidenebis(2-cyclopentylphenol) and m-phenylenediethylidenebis(2-cyclohexylphenol).

Bisphenols of the class wherein both R' and R'' in the general formula are hydrogen are best made by reacting the o-cycloalkylphenol with xylene dichloride or dibromide in the presence of AlCl₃, p-toluenesulfonic acid, or other acidic alkylation catalyst. In this way, there are obtained 4,4'-(p-xylylene)bis(2-cyclohexylphenol), 4,4'-(m-xylylene)bis(2-cyclopentylphenol) and their isomers and homologs.

These new bisphenols are useful for their biological activity. For example, when they are applied to the soil in the form of an aqueous suspension or are otherwise incorporated into the soil in quantities of 1–50 parts per million, these compounds are active preemergent herbicides and nematocides.

These compounds are particularly valuable as stabilizers for normally solid and essentially linear polymers of α-olefins of 2–4 carbon atoms. These polymers include high and low density polyethylene, polypropylene, polybutylene, and also polymers such as ethylene-propylene copolymers. Many known bisphenols have some stabilizing activity in this application but the bisphenols of the present invention have been found to have several times the stabilizing efficiency of bisphenols commonly used to protect such polymers from oxidative degradation. Therefore, smaller amounts of these new compounds can be used, and also stabilized compositions having much longer useful lives can be prepared by using these bisphenols.

As stabilizers in poly-α-olefins, the bisphenols of this invention can be employed in amounts of about 0.001% to about 1% by weight of the polyolefin, depending upon the particular polymer and the degree of protection required. In most cases, 0.01–0.5 percent is preferred. These compounds exhibit their stabilizing effect most strikingly, and are therefore preferably so used, in combination with about 0.02–1 percent by weight of the polyolefin of an auxiliary antioxidant known to promote the stabilizing efficiency of phenolic compounds. Such auxiliary antioxidants include in particular higher alkyl esters of thiodipropionic acid, which esters have the formula $$S(CH_2CH_2CO_2A)_2$$

wherein A is an alkyl radical of 8–20 carbon atoms. Esters such as the octyl, lauryl, pentadecyl, stearyl, and eicosyl diesters are included. Dilauryl 3,3-thiodipropionate is a commonly used and particularly effective ester.

In a representative procedure, a bisphenol is compounded with a poly-α-olefin and the composition is tested as shown below.

EXAMPLE 5

Essentially linearly polymerized crystalline polypropylene was employed for testing. A quatity of about 500 g. of granular polypropylene having a melt index of about 3 was stirred in an open container with about 200 ml. of a methylene chloride solution of the additive or additives to be tested. Stirring was continued until nearly all the methylene chloride had evaporated and the additive had been thoroughly dispersed. The treated polypropylene was dried at 72° F. under nitrogen in a vacuum oven for about four hours.

The additive (or mixture of additives) was then further mixed with the polymer by extrusion at about 250° C. The extruded plastic, after being converted into pellet form for handling, was then compression-molded at about 230° C. into 60 mil thick samples. These test pieces were exposed in a circulating air oven at 150° C. and were examined periodically until the first signs of degradation were noted. This oxidative degradation showed up in the formation of spots of powdery disintegration and embrittlement of the solid structure and was usually associated with a slight darkening of the polymer. The time in hours to reach this point is referred to as the brittle point and the figures listed in the following table represent averages of three samples in each case. In this table, A, B and C represent the new compounds which are the subject of this application and D, E and F represent related prior art compounds.

| Bisphenol additive | Wt. percent additive | | Brittle point, hours |
|---|---|---|---|
| | Bisphenol | DLTDP[1] | |
| A | 0.5 | | 164 |
| A | 0.05 | 0.25 | 1,009 |
| B | 0.05 | 0.25 | 1,056 |
| C | 0.05 | 0.25 | 894 |
| D | 0.05 | 0.25 | 256 |
| E | 0.05 | 0.25 | 256 |
| F | 0.5 | | 112 |
| F | 0.05 | 0.25 | 340 |

[1] Dilauryl 3,3'-thiodipropionate.

A = 4,4'-(p-phenylenediisopropylidene)bis(2-cyclohexylphenol).
B = 4,4'-(p-phenylenediisopropylidene)bis(2-cyclopentylphenol).
C = m-phenylenediisopropylidenebis(2-cyclohexylphenol) (mixed isomers, product of Example 3).
D = 4,4'-(p-phenylenediisopropylidene)diphenol.
E = 4,4'-(p-phenylenediisopropylidene)di-o-cresol.
F = 4,4'-isopropylidenebis(2-cyclohexylphenol).

Prior art compounds D and E were prepared by reacting p-diisopropenylbenzene with phenol and o-cresol respectively according to the general procedure used in Example 1. Compound F was prepared by reacting acetone with o-cyclohexylphenol in the same way.

Similar stabilizing superiority is shown for new compounds A, B and C and the other new compounds of this genus as defined above when these compounds are incorporated in quantities such as shown in linear polyethylene and polybutylene or copolymers such as essentially linear ethylene-propylene copolymers. These compounds can be employed for such use as the individual pure compounds, as mixtures of isomers such as crude or decolorized reaction products, or as mixtures of two or more such compounds and similar stabilizing effects are thereby obtained.

I claim:
1. A composition of matter comprising a normally solid essentially linear poly-α-olefin having 2-4 carbon atoms having incorporated therein a stabilizing quantity of a bisphenol of the formula

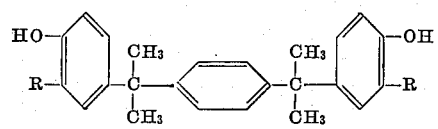

wherein R is cycloalkyl of 5–6 carbon atoms.
2. The composition of claim 1 wherein there is also incorporated into the polyolefin a stabilizing quantity of a higher alkyl diester of thiodipropionic acid.
3. The composition of claim 2 wherein the bisphenol is 4,4'-(p - phenylenediisopropylidene)bis(2 - cyclohexylphenol).
4. The composition of claim 2 wherein the bisphenol is 4,4'-(p - phenylenediisopropylidene)bis(2 - cyclopentylphenol).

5. The composition of claim 1 wherein the polyolefin is polypropylene.

References Cited

UNITED STATES PATENTS 3,251,805  5/1966  Schnell et al. _____ 260—47
3,310,510  3/1967  Breslow _____ 260—45.95

FOREIGN PATENTS 929,435  6/1963  Great Britain _____ 260—45.95

HOSEA E. TAYLOR, JR., Primary Examiner

U.S. Cl. X.R.

260—45.85, 619